United States Patent [19]

Shimegi et al.

[11] Patent Number: 5,375,115
[45] Date of Patent: Dec. 20, 1994

[54] DISK RECORDING AND REPRODUCING APPARATUS HAVING A GUIDE SHAFT COMPRESSION MECHANISM WHICH SECURES A GUIDE SHAFT ALONG WHICH THE HEAD MOVES

[75] Inventors: Hiroo Shimegi; Hidemitsu Fujisawa; Manabu Ogura; Yutaka Hashioka; Kazuhito Sakota, all of Amagasaki; Masayuki Suzuki, Tokorozawa; Keiji Uehara, Iruma; Yoshiki Kirinoe, Toshima; Yasushi Noda, Suginami, all of Japan

[73] Assignees: Mitsubishi Electric Corporation; Teac Corporation, Japan

[21] Appl. No.: 158,155

[22] Filed: Nov. 24, 1993

Related U.S. Application Data

[63] Continuation of Ser. No. 820,993, Jan. 14, 1992, abandoned.

[30] Foreign Application Priority Data

Jan. 16, 1991 [JP]  Japan .................. 3-003483

[51] Int. Cl.⁵ ............................... G11B 17/00
[52] U.S. Cl. .................. 369/244; 369/44.14;
       369/219; 369/215; 360/104
[58] Field of Search ............ 369/244, 44.14, 44.15,
       369/247, 249, 255, 219, 215, 213; 238/349, 342,
       347, 361; 360/104, 106, 105, 107, 109

[56] References Cited

U.S. PATENT DOCUMENTS

| 2,451,414 | 10/1948 | Snyder ........................... 238/349 |
| 4,193,544 | 3/1980 | Marchant et al. ................. 238/349 |
| 4,327,865 | 5/1982 | Greene ............................ 238/349 |
| 4,415,941 | 11/1983 | Gibeau et al. ................... 360/106 |
| 5,063,548 | 11/1991 | Yamashita et al. .............. 369/44.15 |
| 5,111,088 | 5/1992 | Fujino ............................. 369/249 |
| 5,172,367 | 12/1992 | Hinotani ......................... 369/244 |

FOREIGN PATENT DOCUMENTS

| 664528 | 6/1963 | Canada ........................ 238/349 |
| 4001983 | 1/1992 | Japan .......................... 369/244 |

Primary Examiner—Andrew L. Sniezek
Assistant Examiner—Duncan Wilkinson
Attorney, Agent, or Firm—Andrus, Sceales, Starke & Sawall

[57] ABSTRACT

An optical disk apparatus in which a head is accommodated in a movable part which moves the head along a guide shaft in a radial direction of an optical disk. The guide shaft is engageable with the movable part and extends in the radial direction of the optical disk. The optical disk apparatus has a guide shaft compression mechanism which applies a compression force toward the movable part, which force is distributed, approximately uniformly, along the radial direction of the optical disk, to the guide shaft so that the movable part can be properly engaged with the guide shaft so as to move smoothly and stably along the guide shaft in the radial direction of the optical disk.

8 Claims, 6 Drawing Sheets

DISK RECORDING AND REPRODUCING APPARATUS HAVING A GUIDE SHAFT COMPRESSION MECHANISM WHICH SECURES A GUIDE SHAFT ALONG WHICH THE HEAD MOVES

This application is a continuation application of U.S. patent application Ser. No. 07/820,993 filed Jan. 14, 1992, now abandoned.

BACKGROUND OF THE PRESENT INVENTION

The present invention relates generally to a disk apparatus, and more particularly to an optical disk storage in which a movable part having an optical head moves along a guide shaft in a radial direction of an optical disk.

The following is a description of the configuration of a movable part and guide shafts in a conventional optical disk apparatus.

Figure 1A:
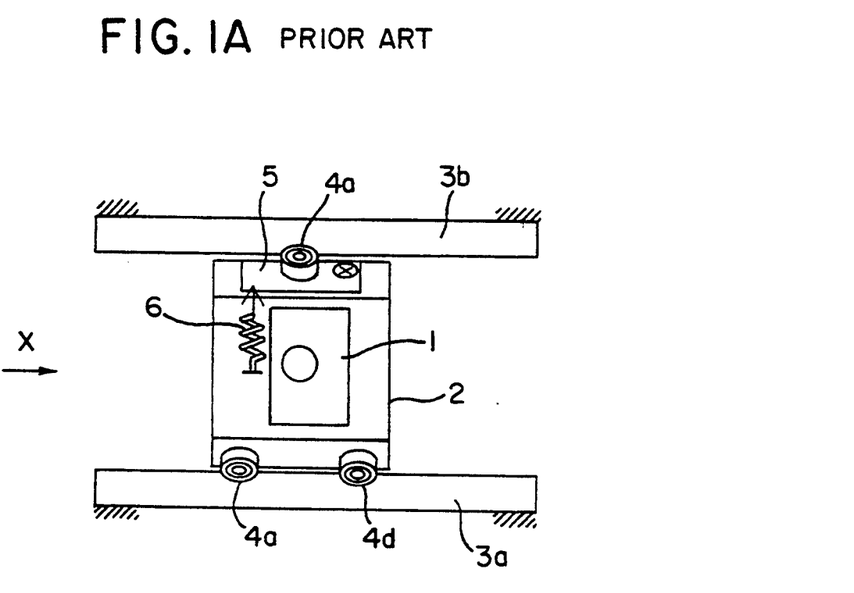
FIG. 1A shows a plan view for explaining one example of a conventional optical disk apparatus.
Figure 1B:
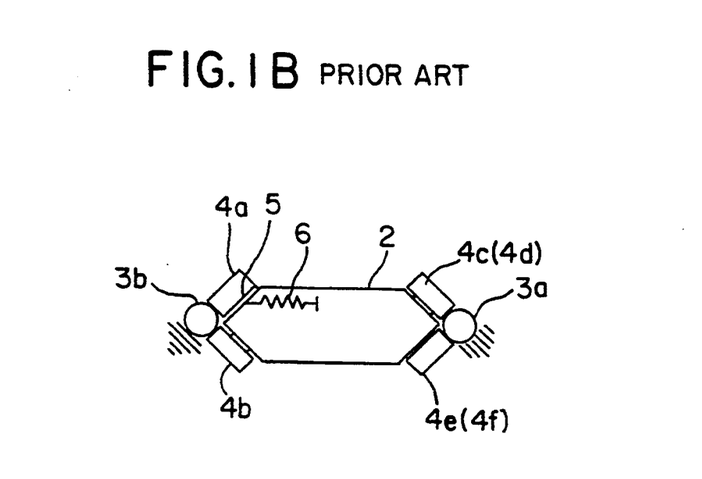
FIG. 1B shows a side view viewed from a direction X shown in FIG. 1A.

In one conventional optical disk apparatus, as shown in FIGS. 1A and 1B, a pair of parallel guide shafts 3a and 3b are fixed on a frame which defines a apparatus body, and a movable part 2 having an optical head 1 is located between the shafts 3a and 3b. These guide shafts 3a and 3b are engageable with the movable part 2 and extend parallel to a radial direction of an optical disk (not shown). As the movable part 2 moves along the guide shafts 3a and 3b, the optical head 1 can move in the radial direction of the optical disk to record information thereon and/or reproduce information therefrom. The movable part 2 has a flat hexagonal section shown in FIG. 1B, and includes six rollers 4a to 4f, a flat plate 5, and a compression spring 6. Four rollers 4c to 4f touch the guide shaft 3a whereas two rollers 4a and 4b touch the guide shaft 3b, the roller 4a being fixed on the flat plate 5. One end of the flat plate 5 is screwed into the movable part 2, and the other end thereof is compressed by the compression spring 6. The roller 4a is thus compressed toward the guide shaft 3b, and the other rollers 4b to 4f are reactively compressed toward the guide shafts 3a and 3b. Since all the rollers 4a to 4f are compressed toward the guide shafts 3a and 3b, the movable part 2 is supported between the shafts 3a and 3b.

Figure 2A:
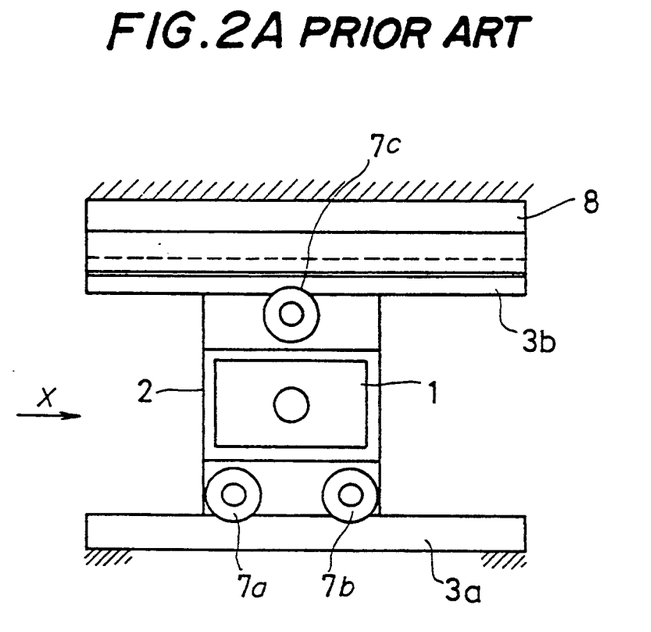
FIG. 2A shows a plan view for explaining another example of a conventional optical disk apparatus.
Figure 2B:
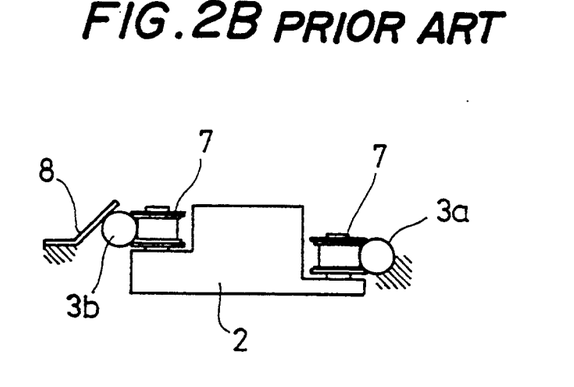
FIG. 2B shows a side view viewed from a direction X shown in FIG. 2A.

In another conventional optical disk apparatus, as shown in FIGS. 2A and 2B, only the guide shaft 3a is fixed on the frame. The movable part 2 includes three rollers 7a to 7c, the rollers 7a and 7b being engaged with the guide shaft 3a, and the roller 7c being engaged with the guide shaft 3b. The guide shaft 3b is compressed toward the roller 7c by a flat spring 8 which is fixed on the frame and extends parallel to the guide shaft 3b. Thus, the rollers 7a and 7b are compressed toward the guide shaft 3a, and the movable part 2 is supported therebetween.

However, the above conventional optical disk apparatuses have the following disadvantages. In the former optical disk apparatus, the movable part 2 includes the compression spring 6, and thus cannot be made small. In addition, although the rollers 4a to 4f must be engaged with the guide shafts 3a and 3b via a desired compression force in order that the movable part 2 can move smoothly and stably along the guide shafts 3a and 3b, it is difficult to obtain the desired compression force since the compression force of the compression spring 6 cannot be adjusted. The latter optical disk apparatus can be made smaller than the former, but since the flat spring 8 comprises a flat plate such that it can easily be deformed, it is difficult to uniformly distribute the compression force thereof along the guide shaft 3b. Due to deviation of the compression force of the flat spring 8, the optical head 1 deviates from a desired position as the movable part 2 moves, hence it cannot properly perform recording/reproducing operations. In addition, the compression force of the flat spring 8 cannot be adjusted.

SUMMARY OF THE INVENTION

Accordingly, it is a general object of the present invention to provide a novel and useful disk apparatus in which the above disadvantages are eliminated.

Another more specific object of the present invention is to provide an optical disk apparatus in which a movable part having an optical head can move stably and smoothly along a guide shaft while the movable part can be made smaller than the conventional one.

According to one feature of the present invention, a disk apparatus comprises a head which records information on a disk and/or reproduces information therefrom, a movable part, coupled to the head, which moves the head, a guide shaft, engageable with the movable part, which extends in a predetermined direction, and a guide shaft compression mechanism which applies a compression force toward the movable part, which force is distributed, approximately uniformly, along the predetermined direction, to the guide shaft so that the movable part can be properly engaged with the guide shaft so as to move smoothly and stably, in the predetermined direction, along the guide shaft.

According to another feature of the present invention, a disk apparatus comprises a frame, a head which records information on a disk and/or reproduces information therefrom, a movable part, coupled to the head, which moves the head, a first guide shaft, fixed on the frame and engageable with the movable part, which extends in a predetermined direction, and a second guide shaft, engageable with the movable part, which extends in the predetermined direction, and a guide shaft compression mechanism which applies a compression force toward the movable part, which force is distributed, approximately uniformly, along the predetermined direction, to the second guide shaft so that the movable part can be properly engaged with the first and second guide shafts so as to move smoothly and stably, in the predetermined direction, along the first and second guide shafts.

According to the present invention, since the compression force uniformly distributed along the predetermined direction is applied to the (second) guide shaft, the head can stably perform the recording/reproducing operations. In addition, since the guide shaft compression mechanism is not included in the movable part, the movable part can be miniaturized.

Other objects and further features of the present invention will become apparent from the following detailed description of the preferred embodiments when read in conjunction with the accompanying drawings.

DETAILED DESCRIPTION OF THE PREFERRED EMBODIMENTS

Figure 3:
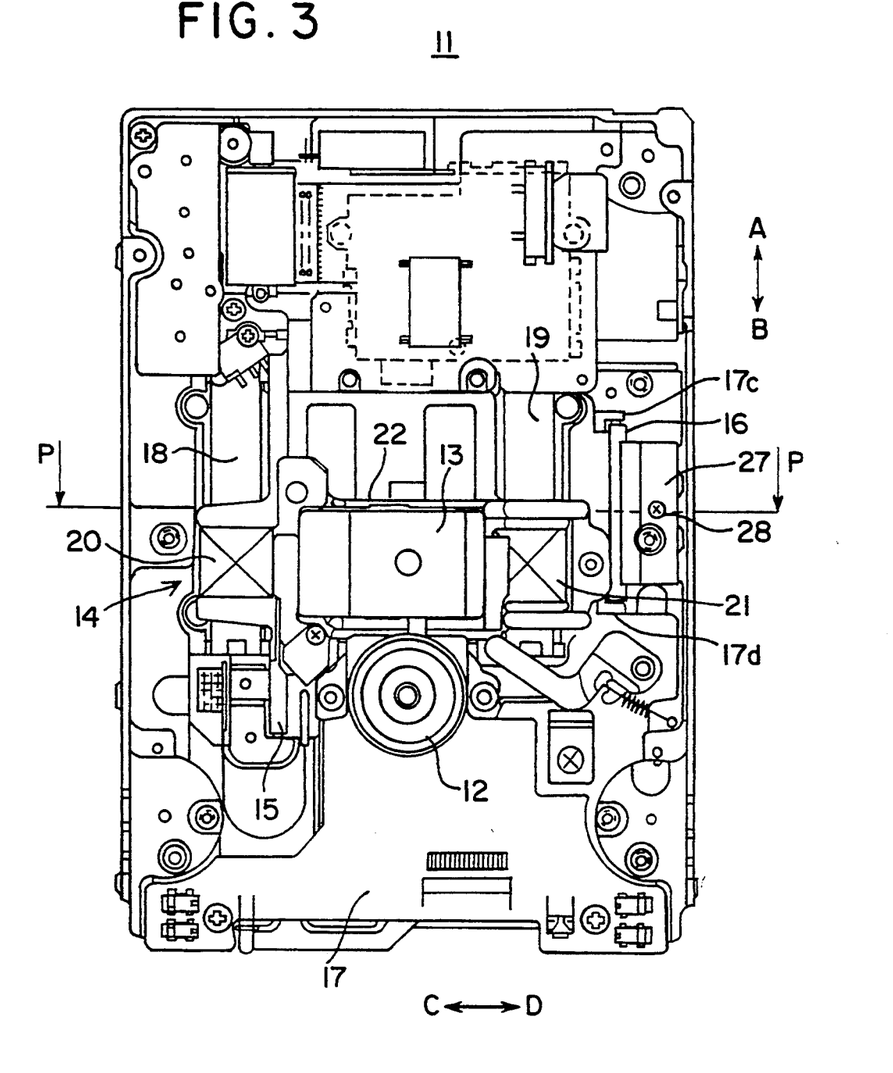
FIG. 3 shows a plan view of an optical disk apparatus according to the present invention.

An optical disk apparatus 11 according to the present invention comprises, as shown in FIG. 3, a turn table 12, a linear actuator 14, guide shafts 15 and 16, and a frame 17. The frame 17 defines the body of the optical disk apparatus 11. An optical disk is placed on the turn table 12. The linear actuator 14 accommodates an optical head 13 therein, and moves along the guide shafts 15 and 16. These guide shafts 15 and 16 extend parallel to directions AB, both ends of the guide shaft 15 being positioned with respect to the directions AB by fixing members (not shown), and both ends of the guide shafts 16 being positioned with respect to the directions AB by L-shaped tabs 17c and 17d each projecting from the frame 17. Since the directions AB are parallel to a radial direction of the optical disk, the optical head 13 can move in the radial direction of the optical disk so as to record information thereon and/or reproduce information therefrom as the linear actuator 14 moves along the guide shafts 15 and 16. Incidentally, as mentioned below, the guide shafts 15 and 16 are prevented from rotating in directions CD orthogonal to the directions AB.

The linear actuator 14 comprises a pair of stick-shaped cores 18 and 19, a pair of coils 20 and 21, and supporting base 22 (movable part). The cores 18 and 19 extend in the directions AB, the core 18 being inserted into the coil 20, and the core 19 being inserted into the coil 21. The cores 18 and 19 and coils 20 and 21 construct a magnetic circuit which drives the linear actuator 14.

Figure 4:
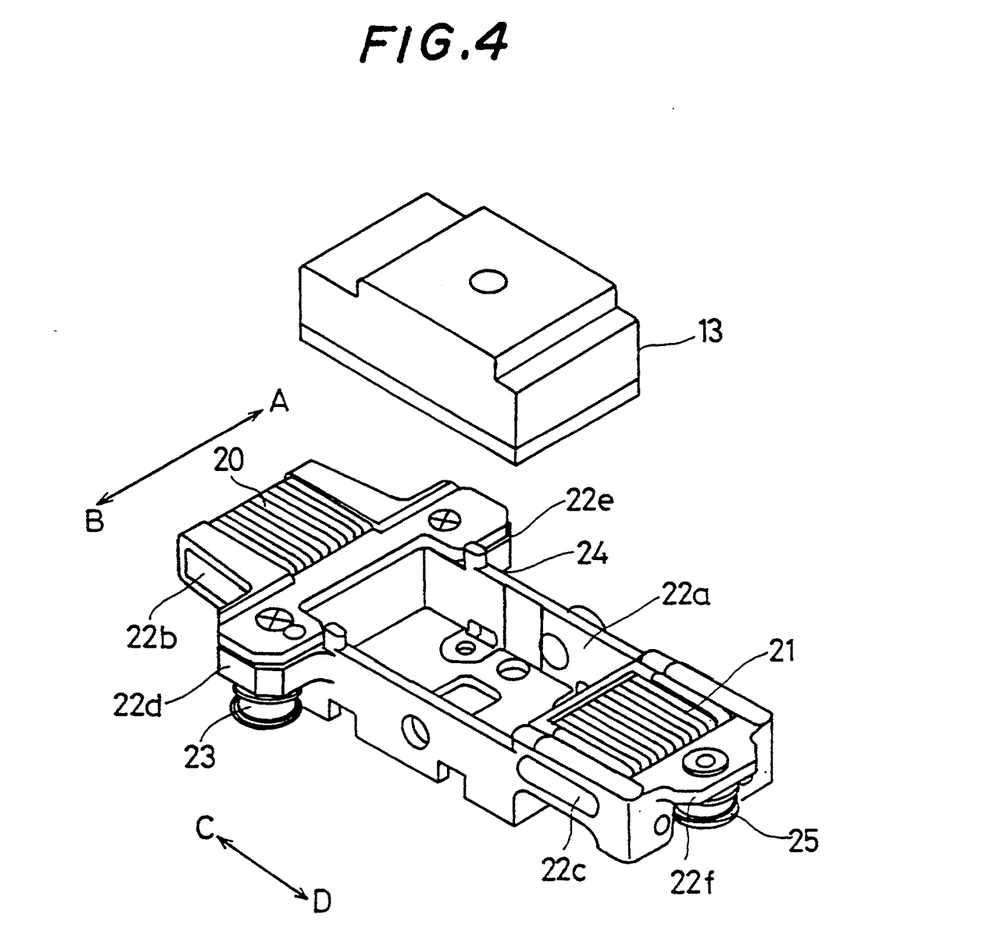
FIG. 4 shows an exploded perspective view of an optical head and a supporting base shown in FIG. 3.

The supporting base 22 is engaged with the optical head 13, the coils 20 and 21 and rollers 23 to 25. As shown in FIG. 4, the supporting base 22 has an accommodation part 22a, piercing holes 22b and 22c and supporting parts 22d to 22f. The accommodation part 22a accommodates the optical head 13 therein. The coil 20 is coiled around the piercing hole 22b, whereas the coil 21 is coiled around the piercing hole 22c. The core 18 is inserted into the piercing hole 22b, whereas the core 19 is inserted into the piercing hole 22c. The supporting part 22d rotatably supports the roller 23, the supporting part 22e rotatably supports the roller 24, and the supporting part 22f rotatably supports the roller 25. The rollers 23 and 24 are rotatably engaged with the guide shaft 15, whereas the roller 25 is rotatably engaged with the guide shaft 16.

Figure 5:
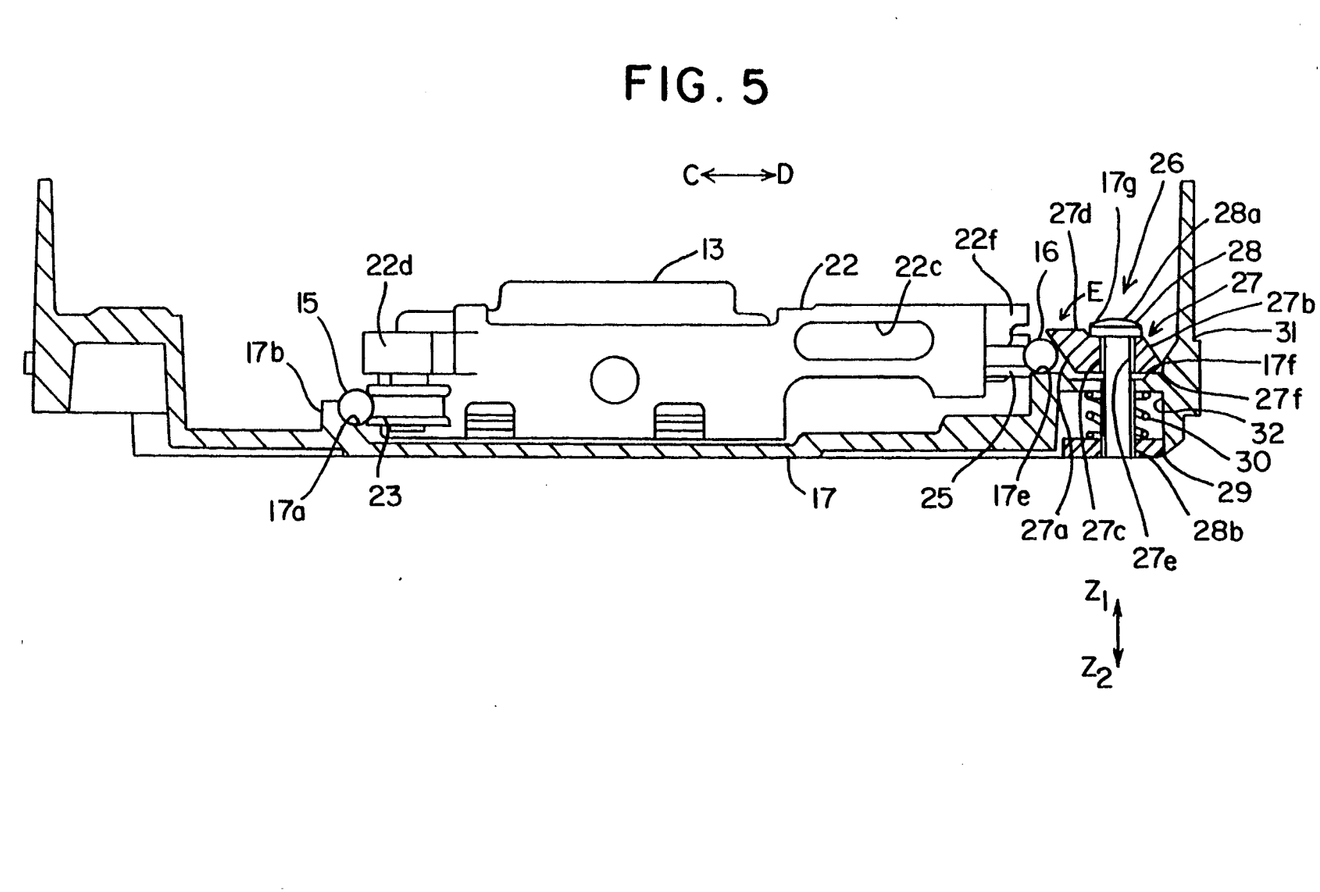
FIG. 5 shows a sectional view taken along a line P—P shown in FIG. 3.

As shown in FIG. 5, the guide shaft 15 is placed on a place part 17a of the frame 17, and it is prevented from being rotated in the direction CD by the roller 23 and tab 17b. Similarly, the guide shaft 16 is placed on the place part 17e, and it is prevented from being rotated in the direction CD by the roller 25 and the guide shaft compression mechanism 26. Incidentally, the optical head 13 shown in FIG. 5 is not shown in cross-section.

The guide shaft compression mechanism 26 according to the present invention applies the compression force in the direction C to the guide shaft 16, which force is distributed approximately uniformly along the directions AB. As shown in FIG. 5, the guide shaft compression mechanism 26 comprises a compression block 27, a compression force adjusting screw 28, a nut plate 29, and a compression coil spring 30.

The compression block 27 extends in the directions AB, and touches the guide shaft 16. The compression block 27 has a parallelogram shaped cross-section with respect to a surface perpendicular to the directions AB, and comprises inclined surfaces 27a and 27b, a lower surface 27c, an upper surface 27d, piercing holes 27e and 27g, and a corner 27f. The inclined surface 27a is opposite to the inclined surface 27b, and the lower surface 27c is opposite to the upper surface 27d. The inclined surface 27a touches the guide shaft 16. The piercing hole 27e is provided near the center of the upper surface 27d. The corner 27f, defined by the inclined surface 27b and lower surface 27c, contacts projecting parts 31a to 31c, which project in the direction C from a side wall 31 of the frame 17, and a placement part 17f of the frame 17. Thus, the compression block 27 is prevented from rotating in directions FG shown in FIG. 6A. The contact part of each of the projecting parts 31a to 31c, which is in contact with the corner 27f, is flat along the directions AB. Since a groove 17g extending in the directions AB is provided between the lower surface 27c and the frame 17, the compression block 27 can rotate around the corner 27f in a direction E and compress the guide shaft 16 via the inclined surface 27a. The compression block 27 can be regarded as a rigid body, so that it is not transformed by a twist or a distortion. In addition, the inclined surface 27a is in line-contact with the guide shaft 16 at a range including a range where the supporting base 22 moves on the guide shaft 16. Therefore, the compression force of the compression block 27 is uniformly distributed along the AB directions. The compression force transmitted to the guide shaft 15 and the roller 23 and 24. Since the guide shaft 16 is located at a position higher than that of the guide shaft 15, the supporting base 22 is compressed in a direction $Z_2$ shown in FIG. 5. Incidentally, only if the compression block 27 applies the compression force in the direction C distributed uniformly along the AB direction to the guide shaft 16, may the sectional shape of the compression block 27 be other than a parallelogram as shown in FIG. 5. For example, the sectional shape of the compression block 27 may be made a rectangle, and compression means for compressing the compression block 27 in the direction C may be provided. However, in this embodiment, the screw 28, nut plate 29 and compression coil spring 30 are provided as the most efficient way a large space being provided for the compression means, which space would make the optical disk apparatus 11 broader in the directions CD.

Figure 6A:
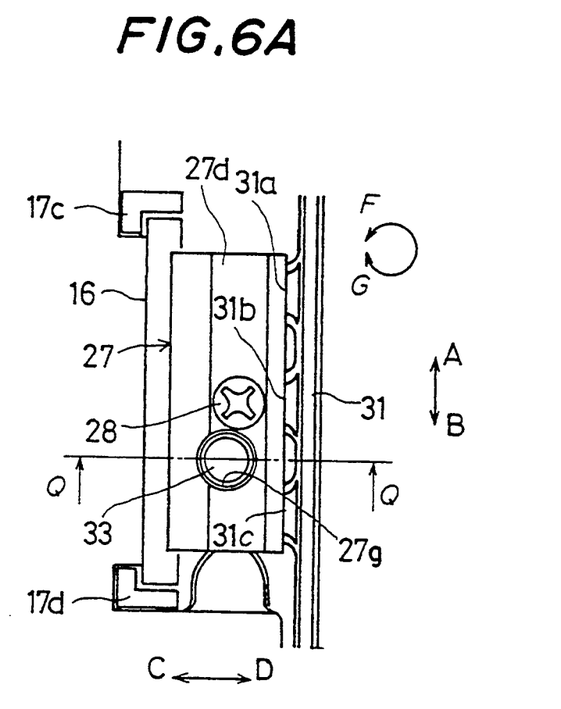
FIG. 6A shows a guide shaft compression mechanism shown in FIG. 3.
Figure 6B:
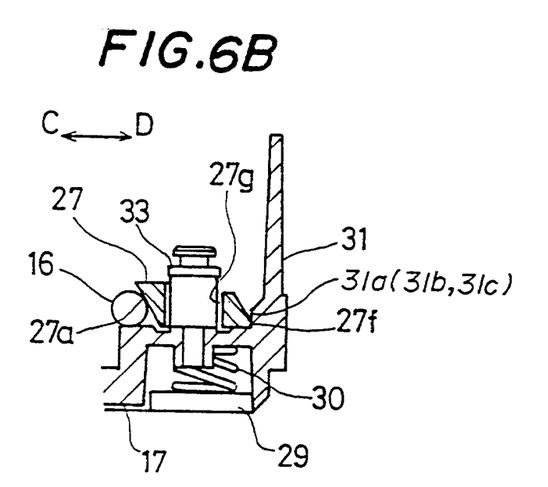
FIG. 6B shows a sectional view taken along a line Q—Q shown in FIG. 6B.

Incidentally, as shown in FIGS. 6A and 6B, a reference pin 33 is inserted loose into the piercing hole 27g. The reference pin 33, mounted on the frame 17, restricts the height of an optical disk to be loaded.

The screw 28, piercing through the piercing hole 27e of the compression block 27 and a hole 17b of the frame 17, fixes the compression block 27 on the frame 17 and adjusts the compression force applied to the guide shaft 16.

The nut plate 29, accommodated in the concave portion 32 provided in a lower surface of the frame 17, is engaged with the screw 28. The concave portion 32 has a square shape viewed from a direction $Z_1$ shown in FIG. 5, and the nut plate 29 also has a square shape corresponding to that of the concave portion 32. Therefore, even when the screw 28 is fastened, the nut plate 29 does not rotate, at most it ascends.

The coil spring 30, accommodated in the concave portion 32, compresses the nut plate 29 downwardly. The tighter the screw 28 is fastened, the higher the nut plate 29 ascends, thus compressing the coil spring 30. The coil spring 30 applies the spring force $S_f$ in the direction $Z_2$ to the compression block 27 via a spring head 28a of the spring 28. As a result, a moment M in the direction E is applied to the compression block 27. The magnitude of this moment may be obtained by multiplying the spring force $S_f$ by a distance D between the spring head 28a and the corner 27f.

Next follows a description of the operation of the optical disk apparatus 11 according to the present invention. First, the screw 28 is fastened by a predetermined amount so as to tentatively compress the guide shaft 16 via the inclined surface 27a of the guide shaft compression mechanism 26, then it is judged whether or not the supporting base 22 can move smoothly and stably in the directions AB. The predetermined amount by which the screw 28 is tightened is adjusted based on the moving condition of the supporting base 22. The predetermined amount may be determined by the distance by which the screw 28 projects from the nut plate 29. After the desired compression force is applied to the guide shaft 16, the optical disk apparatus 11 is shipped or the recording/reproducing operations are performed.

The guide shaft compression mechanism 26 is located outside the supporting base 22, and thus does not prevent the supporting base 22 from being miniaturized. In addition, the compression force can be easily adjusted by the screw 28. Incidentally, the present invention is applicable to other disk apparatuses.

As mentioned above, according to the disk apparatus of the present invention, a compression force uniformly distributed along a longitudinal direction of a guide shaft is applied to the guide shaft via a rigid member. The compression force can be easily adjusted. Therefore, a head can stably record information on a disk and/or reproduce information therefrom, while a movable part having the head can be miniaturized.

Further, the present invention is not limited to these preferred embodiments, as various variations and modifications may be made without departing from the scope of the present invention.

What is claimed is:

1. A disk apparatus comprising:
   a head performing at least one of recording information on a disk having a recording surface and reproducing information therefrom;
   a head carriage, coupled to said head, which moves said head;
   a guide shaft for guiding said head carriage in a fixed plane parallel to the recording surface of the disk so as to move along a radial direction of the disk, said guide shaft being subjected to a pushing force;
   a guide shaft loading member which is in contact with said guide shaft approximately uniformly along a major length of said guide shaft and which loading member is movable with respect to said guide shaft;
   means for engaging said guide shaft loading member so as to cause said guide shaft loading member to push said guide shaft toward said head carriage; and
   guiding means for engaging said guide shaft so as to guide said guide shaft to move in said fixed plane parallel to the recording surface of the disk.

2. A disk apparatus according to claim 1, wherein said means engaging said guide shaft loading member comprises:
   an adjusting member for adjusting the magnitude of the pushing force of said means engaging said guide shaft loading member.

3. A disk apparatus according to claim 1, further comprising:
   a frame; and
   a fixed guide shaft, fixed on said frame, for guiding said head so as to move along a radial direction of the disk.

4. A disk apparatus according to claim 3, wherein said means engaging said guide shaft loading member comprises
   an adjusting member for adjusting the magnitude of the pushing force of said means engaging said guide shaft loading member.

5. A disk apparatus according to claim 3, wherein said guide shaft subjected to the pushing force is located at a position higher than that of said fixed guide shaft with respect to said frame.

6. A disk apparatus according to claim 3, wherein said head carriage can move from a first position to a second position along said guide shaft subjected to a pushing force, and wherein the guide shaft loading member comprises a rigid body which is in line-contact with said guide shaft subjected to a pushing force at least from said first position of said head carriage to said second position thereof.

7. A disk apparatus comprising:
   a head performing at least one of recording information on a disk and reproducing information therefrom;
   a head carriage, coupled to said head, which moves said head;
   a guide shaft for guiding said head carriage so as to move along a radial direction of the disk, said guide shaft being subjected to a pushing force;
   a guide shaft loading member which is in contact with said guide shaft approximately uniformly along a major length of said guide shaft;
   means for engaging said guide shaft loading member so as to cause said guide shaft loading member to push said guide shaft toward said head carriage;
   wherein said means engaging said guide shaft loading member comprises:
   an adjusting member for adjusting the magnitude of the pushing force of said means engaging said guide shaft loading member;
   a frame; and
   a fixed guide shaft, fixed on said frame, for guiding said head so as to move along a radial direction of the disk;
   wherein said guide shaft loading member has a parallelogram shape, when sectioned with respect to a surface perpendicular to the direction along said guide shafts, which parallelogram section has a corner in contact with said frame so that said guide shaft loading member can rotate around said corner, and which parallelogram has a side in contact with said guide shaft subjected to a pushing force; and wherein said adjusting member applies a moment about said corner to said guide shaft loading member, by which moment said guide shaft loading member pushes said guide shaft subjected to a pushing force.

8. A disk apparatus comprising:

a head performing at least one of recording information on a disk and reproducing information therefrom;

a head carriage, coupled to said head, which moves said head;

a guide shaft for guiding said head carriage so as to move along a radial direction of the disk, said guide shaft being subjected to a pushing force;

a guide shaft loading member which is in contact with said guide shaft approximately uniformly along a major length of said guide shaft;

means for engaging said guide shaft loading member so as to cause said guide shaft loading member to push said guide shaft toward said head carriage;

wherein said means engaging said guide shaft loading member comprises:

an adjusting member for adjusting the magnitude of the pushing force of said means engaging said guide shaft loading member;

a frame; and a fixed guide shaft, fixed on said frame, for guiding said head so as to move along a radial direction of the disk;

wherein said guide shaft loading member has a parallelogram shape, when sectioned with respect to a surface perpendicular to the direction along said guide shafts, which parallelogram section has a corner in contact with said frame so that said guide shaft loading member can rotate around said corner, and which parallelogram has a side in contact with said guide shaft subjected to a pushing force;

wherein said adjusting member applies a moment about said corner to said guide shaft loading member, by which moment said guide shaft loading member pushes said guide shaft subjected to a pushing force; and wherein said adjusting member comprises:

a screw having a screw head in surface-contact with said guide shaft loading member, which screw pierces through said guide shaft loading member and said frame in order to fix said guide shaft loading member onto said frame and in order to adjust the moment applied to said guide shaft loading means about said corner;

a nut provided in a concave portion formed in a lower surface of said frame so as to be engaged with said screw, said nut being engaged with said concave portion so that said nut cannot rotate when said screw is being rotated; and a compression spring through which a fastening portion of said screw is passed, said compression spring being located between said frame and said nut, wherein, when said screw is rotated, said screw can be inserted into said nut so as to compress said compression spring a spring force of said compression spring being transmitted to said guide shaft loading member, via said screw head, to thus increase the moment applied to said guide shaft pushing means about said corner.

* * * * *